P. T. Share.

9515X

Whiffletree.

No. 1

Patented Mar. 18, 1836

N. PETERS, PHOTO-LITHOGRAPHER, WASHINGTON, D. C.

3/18/1836 9515X

Mar. 18. 1836

Philip T. Shaw [illegible] 199

Figure 1:
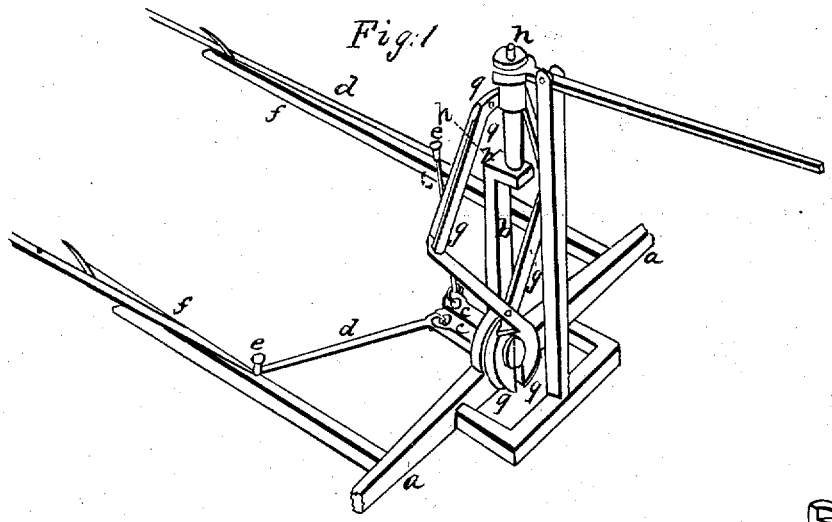
Figure 3:
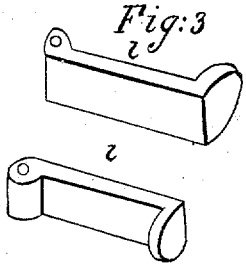
Figure 4:
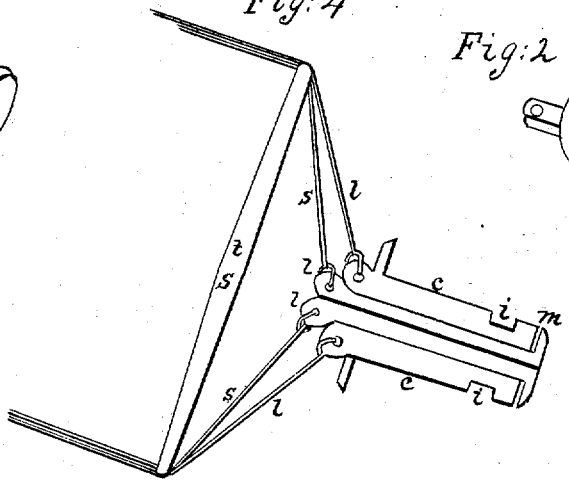
Figure 2:
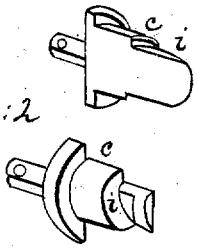

The schedule referred to in these Letters Patent and making
part of the same containing a description in the words of the said
Philip T. Shaw himself of his improvement in the detacher for
detaching horses from carriages or for mechanical purposes
To all to whom these presents shall come Be it known
that I Philip T. Shaw of the City of Baltimore and State
of Maryland have invented a new and useful improvement
in the detacher for detaching horses from carriages or for mechan
ical purposes & that the following [illegible] and reference with
the accompanying drawing are a full and exact description
of the principles of this invention. Fig. 1 is a perspective [illegible]
of the detaching apparatus, a.a. is a section or part of the
carriage with an upright piece b. forming a solid connection.
Through the angle is a circular [illegible] hole through which
[illegible] the pieces c.c. which are also [illegible] detached, at
Fig. 2. — To the [illegible] of these are attached the traces d.d.
which [illegible] round the roller [illegible] on the shaft - fig. 5. The man
ner in which the pieces c.c. are kept in their place or de
tached, is by means of the [illegible] or combined lever apparatus
fig. 3 c. h.h. is a rod [illegible] through the upper termina
tion of the combined lever with a spiral spring round it
between the tips of this lever and the top of the upright piece
b. This spring [illegible] the lever upwards and at the same
time the jaws of the lever g.g. [illegible] into the recess or [illegible]
[illegible] in the pieces c.c. When it is required to detach the
pieces c.c. to free the horses with the traces to which the pieces
c.c. are attached, the end of the lever at [illegible] which
contracts the spiral spring [illegible] the perpendicular angle
of the levers and opens the jaws g.g. when the pieces c.c.
are drawn out forward by the horses. The [illegible] l.l. fig. 6. are
the same as l.l. fig 4. They are interposed between c.c. fig.
3. (which are the same as c.c. in figs. 1&2) and are designed for
the 3/18/1836 9515x two horses, one before the other. l.l. is for the hind horse & c.c. for the leader. The pins g.g. hole into the [illegible] or wagon i.i. the same as in the single horse apparatus in fig. 1. but the pins [being [illegible] which [illegible] lap over the [illegible] c.c. or [illegible]] prevent the pieces l.l. from being detached before c.c. are free. T.T. is a single tree (which is not drawn in perspective & so is not the shafts f.f.) it being unessential to represent the principle). The principle of this detacher is applicable to every kind of carriage or to sleds, or to any kind of Mechanical purpose where detaching apparatus are required. By the employment of compound levers instead of the single lever H. a downward pressure may be used. or by means of an upright projecting rod and hooked top a simple push downwards will effect the disengagement, or by means of a rod reaching downwards from any convenient part of the combined levers the foot may effect the disengagement. I claim the principle of the plug c.c. as well as pieces l.l. together with the combined lever apparatus for detaching or disengaging horses or other animals from all kinds of Carriages or sleds, for Rail Road cars as well as Mechanical purposes N.B. Witnesses
[illegible], 1837 James Mc Nell } Phil. [illegible] Ware
Lewis P. Clark.

(Patented March 15, 1836) [5833 words)

Drawing